United States Patent [19]

Graham et al.

[11] Patent Number: 5,598,812
[45] Date of Patent: Feb. 4, 1997

[54] PASSENGER RESTRAINT SYSTEM

[76] Inventors: Richard D. Graham, 73 N. 300 East;
Jerry D. Mangum, 150 N. 100 West,
both of Emery, Utah 84522

[21] Appl. No.: 346,749

[22] Filed: Nov. 30, 1994

[51] Int. Cl.⁶ .................................................. A62B 35/00
[52] U.S. Cl. ................................. 119/770; 119/771
[58] Field of Search ........................... 119/770, 771, 119/857; 297/466, 467

[56] References Cited

U.S. PATENT DOCUMENTS

| | | |
|---|---|---|
| 2,059,563 | 11/1936 | Donoghue . |
| 2,295,806 | 9/1942 | Peterson . |
| 4,004,583 | 1/1977 | Johnson . |
| 4,620,535 | 11/1986 | Nesbitt .................. 269/328 X |
| 4,728,553 | 3/1988 | Daniels ................... 428/100 |
| 4,949,679 | 8/1990 | Wolfer .................. 128/878 X |
| 5,183,007 | 2/1993 | Vincent ................. 119/857 X |
| 5,325,818 | 7/1994 | Leach ....................... 119/770 |
| 5,511,515 | 4/1996 | Brown et al. ............. 119/771 |

*Primary Examiner*—Robert P. Swiatek
*Attorney, Agent, or Firm*—Trask, Britt & Rossa

[57] ABSTRACT

A restraining device for use in a vehicle to prevent the movement of a subject's arms, when wearing hand and arm restraints such as handcuffs, and the subject's legs. The device includes "T" shaped members of flexible material having one or more crossbar portions and a stem portion. A handcuff or double action safety hook or hook-and-loop fasteners are used for attachment to the subject's hand and arm restraints, thus securing the subject's arms either behind or in front of him. A D-ring and hook-and-loop fasteners or a spring loaded buckle may be used for securing the crossbar member around the subject's legs. In one embodiment, the restraining device is attached to the vehicle by a metal bracket attached to the vehicle floor in front of or behind the seat. The restraining device may be either permanently or detachably attached to the metal bracket in a permanent or a detachable mode, such as a hook affixed to the restraining device.

12 Claims, 6 Drawing Sheets

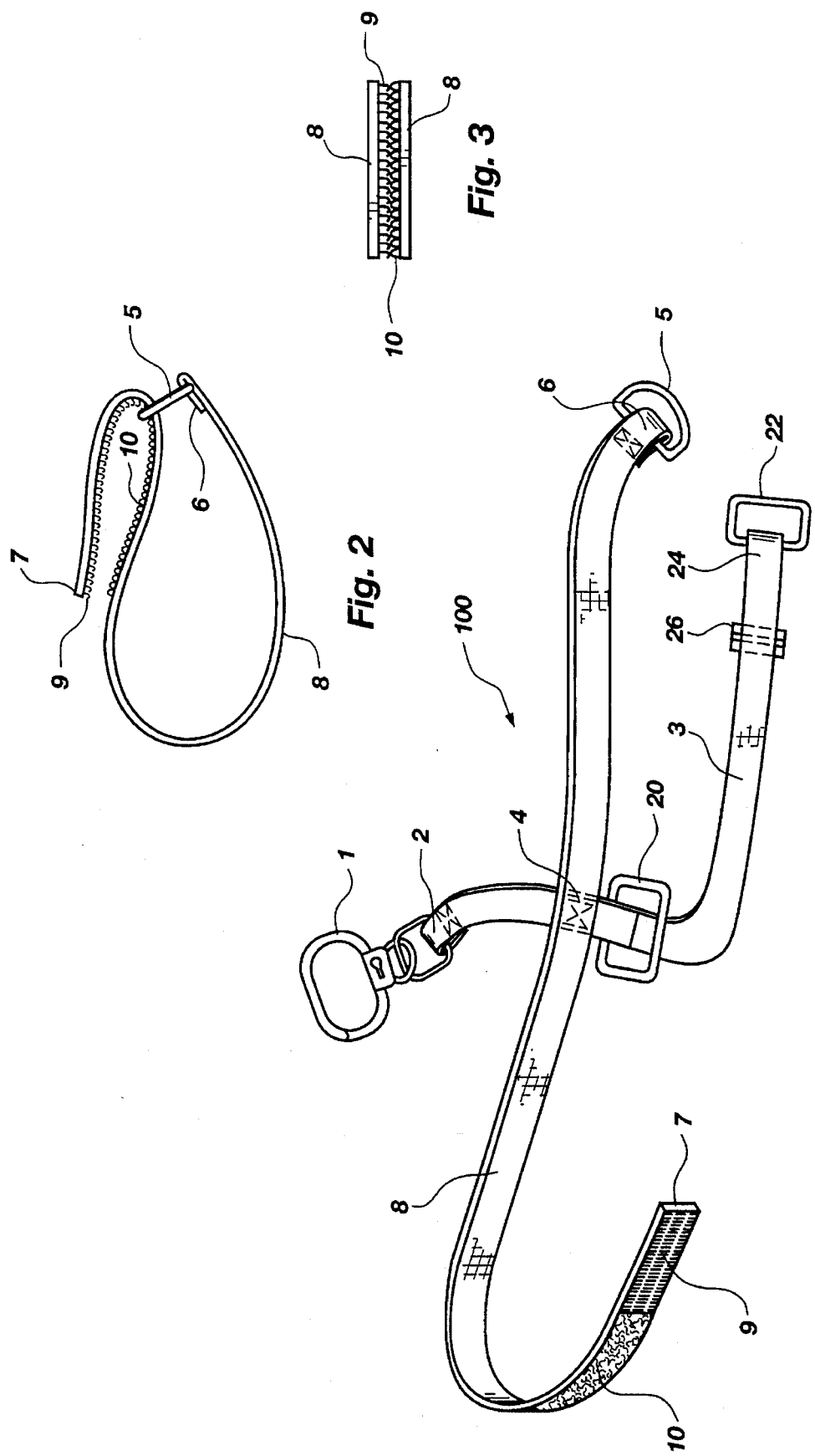

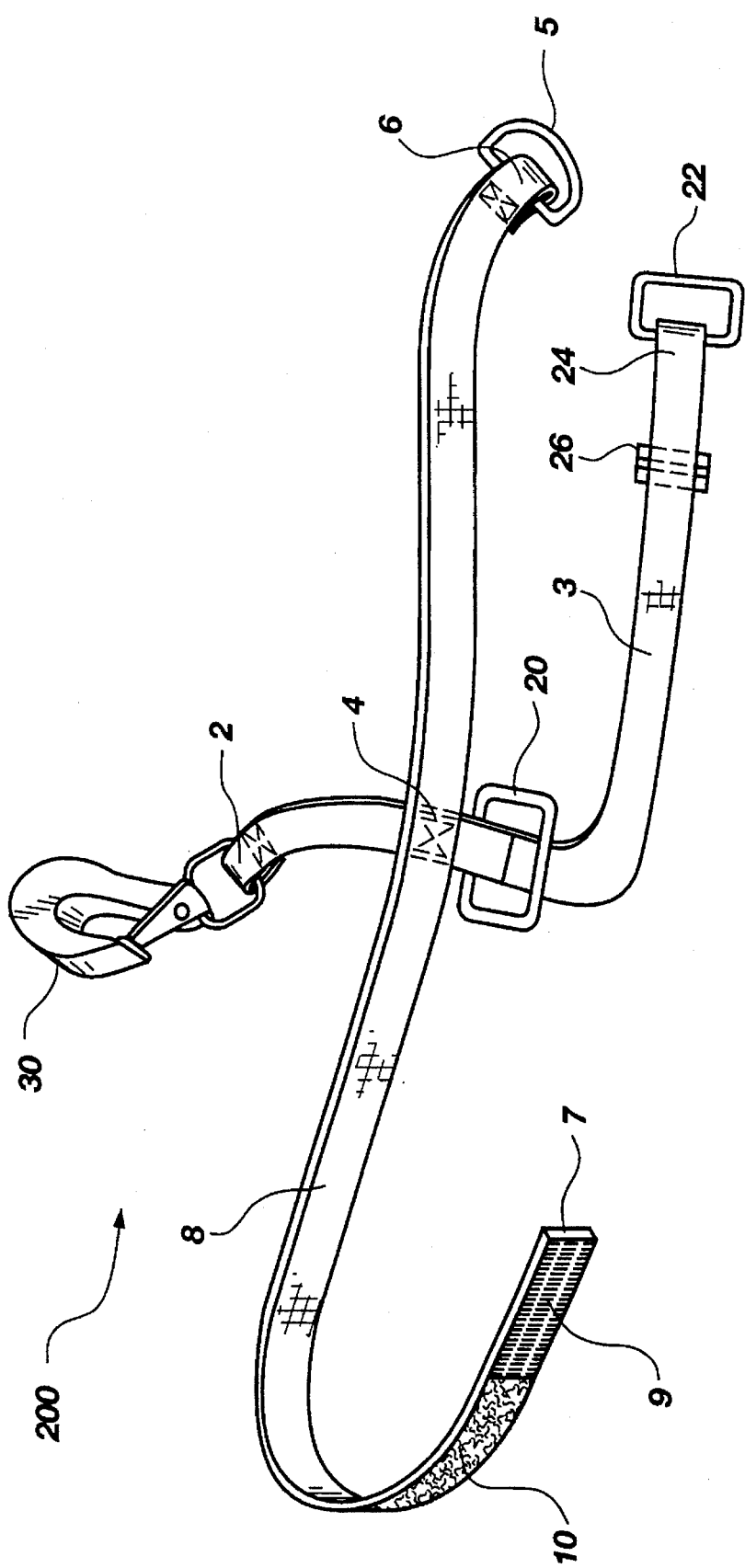

5,598,812

PASSENGER RESTRAINT SYSTEM

TECHNICAL FIELD

The present invention pertains to restraint systems for passengers in a vehicle, and more particularly, to a restraint system that secures and limits movement of subjects in a motor vehicle used by law enforcement personnel.

BACKGROUND OF THE INVENTION

1. Field of the Invention

Law enforcement personnel transporting subjects or prisoners must be protected as well as the subject or prisoner protected from self injury. One method of protection uses a metal cage enclosing the back seat or seats of a vehicle. A drawback to this method is that subjects or prisoners can move about, kicking with their feet and hitting with their hands, even in handcuffs, endangering themselves as well as others. A metal cage is expensive, difficult to install, and limited in its capacity to restrict a subject's movements.

2. State of the Art

Various devices for restraining a subject in a vehicle have been provided, such as U.S. Pat. No. 4,949,679 to Wolfer, U.S. Pat. No. 4,728,553 to Daniels and U.S. Pat. No. 4,004,583 to Johnson. However, these and other restraining devices have many limitations. For instance, none of these devices are affixed to a vehicle and none are capable of restraining the movement of both the arms of a subject wearing hand and arm restraints, and the subject's legs.

There is a need for a restraining device that will more effectively limit the movements of a subject in a vehicle. Specifically, there is a need for a device to restrain the legs, as well as the arms, of a subject wearing hand and arm restraints. Moreover, there is a need for a device that is inexpensive to produce and market and easy to install in a vehicle.

SUMMARY

The present invention is directed to a restraining device for use in a vehicle to restrict the movement of the legs and arms of a subject wearing hand and arm restraints. The invention comprises a "T" shaped flexible filament, such as a member of webbing material or the like, having a stem portion, a first filament, and a crossbar member, a second filament. Affixed to the free end of the stem portion are means for attaching the stem portion to arm and hand restraints worn by a subject. The subject's hands may be positioned in front of or behind the subject. In one embodiment of the invention, the means for attaching the stem portion of the restraint to the subject's handcuffs is a handcuff. Alternately, a double action safety hook or hook-and-loop fasteners may be used rather than a handcuff.

Another embodiment of the invention comprises a D-ring affixed to one end and hook-and-loop fasteners affixed to the other end for looping through the D-ring and securing the end against itself. Yet another embodiment comprises a D-ring secured to the stem portion, a D-ring affixed to one end and hook-and-loop fasteners affixed to the other end of the crossbar portion for fastening the ends together around the subject's legs in a similar manner. As an alternative, a spring loaded buckle may be affixed to one end of the crossbar member. The free end of the crossbar member may then be placed through the spring loaded buckle, thereby securing the crossbar member around the subject's legs.

The invention further comprises a means for attaching the restraining device to a vehicle such as a metal bracket attached to the floor of a vehicle in front or behind the seat. The invention further comprises a means for selectively attaching the restraining device to the metal bracket comprising a releasable hook affixed to the restraining device and attachable to the metal bracket.

BRIEF DESCRIPTION OF THE DRAWINGS

The foregoing and other features and advantages of the present invention will become more readily appreciated as the same becomes better understood by reference to the following detailed description when taken into conjunction with the accompanying drawings wherein:

FIG. 1 is an isometric projection of a restraining device formed in accordance with a first embodiment of the present invention as configured prior to installation in a vehicle;

FIG. 2 is a view of a portion of the crossbar member of FIG. 1 representing the means for securing the two ends of the crossbar together;

FIG. 3 is a view of securing the two ends of the crossbar together;

FIG. 4 is an isometric projection of a restraining device formed in accordance with a second embodiment of the present invention as configured prior to installation in a vehicle;

DETAILED DESCRIPTION OF THE INVENTION

Figure 5:
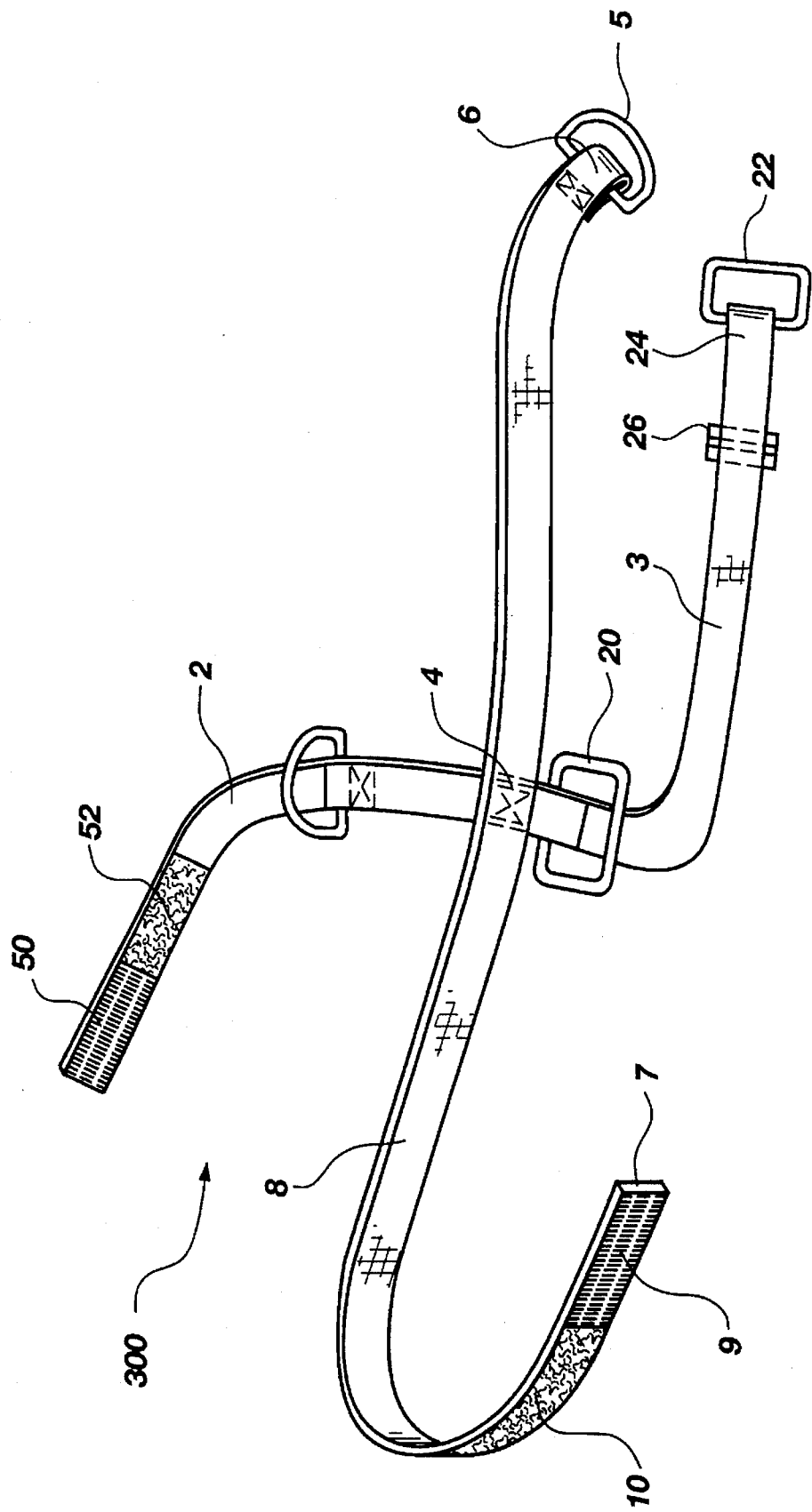
FIG. 5 is an isometric projection of a restraining device formed in accordance with a third embodiment of the present invention as configured prior to installation in a vehicle.

Referring to drawing FIG. 1, a first embodiment 100 of the restraining device of the present invention is shown. The restraining device 100 comprises a handcuff 1 attached to the first end 2 of the first flexible element or stem 3 attached at 4 to a second flexible element or crossbar 8 by any suitable means, such as sewing, rivetting, etc. The second flexible element 8 includes a first end 6 having a D-ring 5 attached thereto and a second end 7 having a loop portion 10 and hook portion 9 of a hook-and-loop fastener thereon.

The first embodiment 100 further includes another D-ring 20 connected to the first flexible element or stem 3 by any suitable means and D-ring 22 attached to the second end 24 of first flexible element or stem 3. The length of the stem 3 may be adjusted through use of adjustment buckle 26 which has one end of stem 3 secured thereto and is slidable along the portion of stem 3 extending beyond 4 where stem 3 is attached to crossbar member 8.

Referring to drawing FIG. 2, the second flexible element 8 is shown having second end 7 looped through D-ring 5 of first end 6 with the loop portion 10 of end 7 overlaid by hook portion 9.

Referring to drawing FIG. 3, the hook portion 9 of end 7 is shown engaging loop portion 10 of end 7.

Referring to drawing FIG. 4, a second embodiment 200 of the restraining device of the present invention is shown. The restraining device 200 comprises a double action safety hook 30 attached to the first end 2 of the first flexible element or stem 3 attached at 4 to a second flexible element or crossbar 8 by any suitable means, such as sewing, rivetting, etc. The second flexible element 8 includes a first end 6 having a D-ring 5 attached thereto and a second end 7 having loop portion 10 and hook portion 9 of a hook-and-loop fastener thereon. The second embodiment 200 further includes D-ring 20 connected to the first flexible element or stem 3 by any suitable means and a D-ring 22 attached to the second end 24 of the first flexible element or stem 3. As previously described, the length of the stem 3 may be adjusted by adjustment buckle 26.

Referring to drawing FIG. 5, a third embodiment 300 of the restraining device of the present invention is shown. The restraining device 300 comprises a loop portion 50 and hook portion 52 of a hook-and-loop fastener attached to the first end 2 of the first flexible element or stem 3 attached at 4 to a second flexible element or crossbar 8 by any suitable means, such as sewing, rivetting, etc. The second flexible dement 8 includes a first end 6 having a D-ring 5 attached thereto and a second end 7 having loop portion 10 and hook portion 9 of a hook-and-loop fastener thereon. The third embodiment 300 further includes a D-ring 20 connected to the first flexible element or stem 3 by any suitable means and a D-ring 22 attached to the second end 24 of the first flexible element or stem 3. The length of the stem 3 may be adjusted through the use of adjustable buckle 26.

Figure 6:
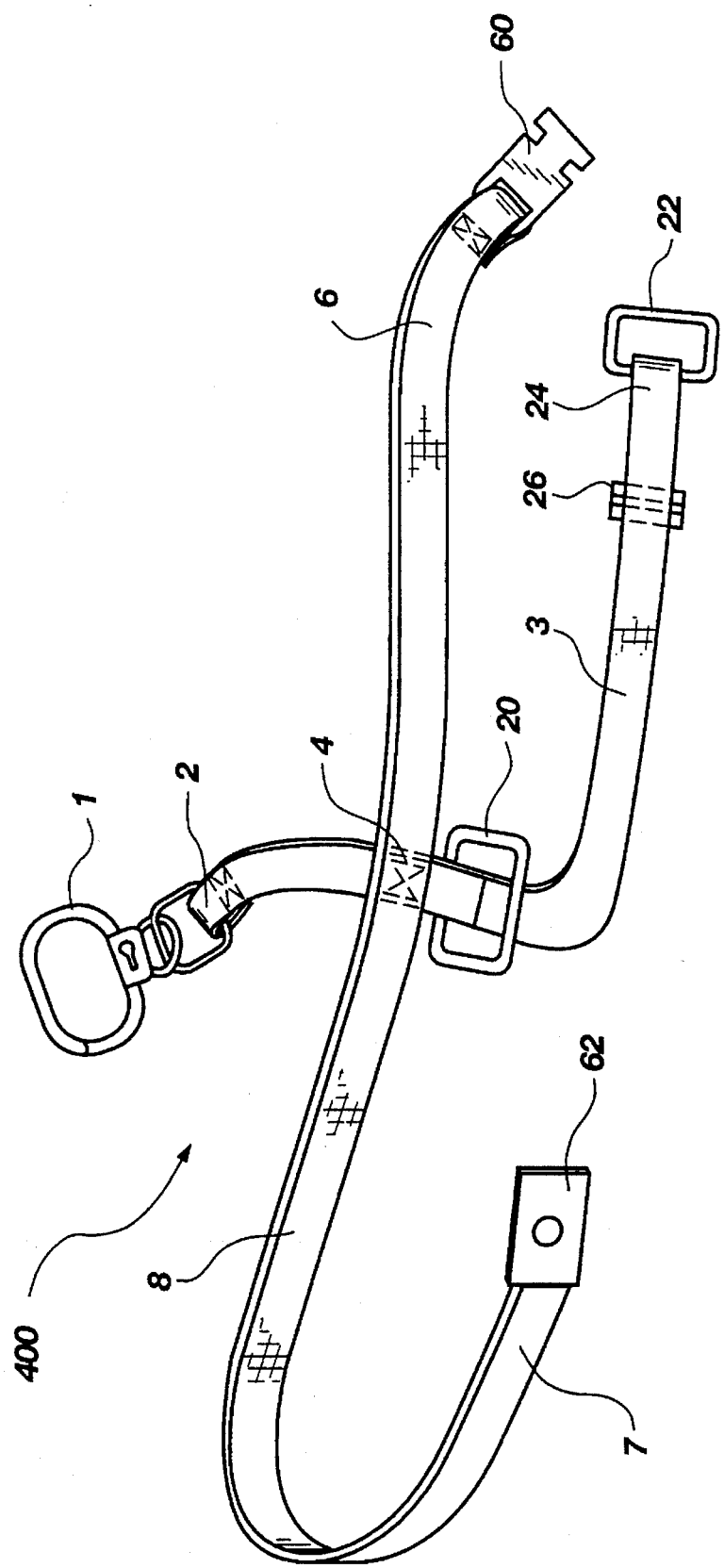
FIG. 6 is an isometric projection of a restraining device formed in accordance with a fourth embodiment of the present invention as configured prior to installation in a vehicle.

Referring to drawing FIG. 6, a fourth embodiment 400 of the restraining device of the present invention is shown. The restraining device 400 comprises a handcuff 1 attached to the first end 2 of the first flexible element or stem 3 attached at 4 to a second flexible element or crossbar 8 by any suitable means, such as sewing, rivetting, etc. The second flexible element 8 includes a first end 6 having a buckle insert 60 attached thereto and a second end 7 having a suitable spring loaded buckle 62 thereon which mates with buckle insert 60. The fourth embodiment 400 further includes a D-ring 20 connected to the first flexible element of stem 3 by any suitable means and a D-ring 22 attached to the second end 24 of the first flexible element or stem 3. The length of the stem 3 may be adjusted through the use of adjustable buckle 26.

Figure 7:
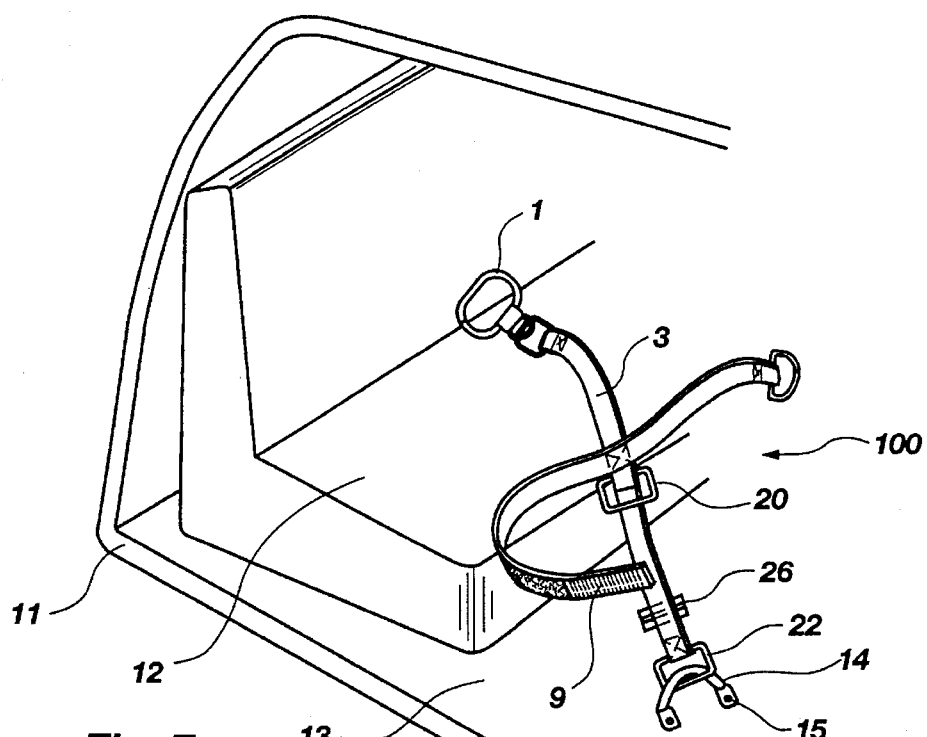
FIG. 7 is an isometric projection of one configuration and mode of attaching the restraining device to the floor of a vehicle.

Referring to drawing FIG. 7, the restraining device 100 is shown in a first position with respect to installation in an automobile. A generally U-shaped metal bracket 14 is secured at any desired location on the floor 13 of a vehicle by use of suitable fasteners 15, such as sheet metal screws or bolts, in front of a seat 12 in the automobile. The restraining device is connected to the bracket 14 by means of any D-ring 22 or any suitable releasable hook means (shown schematically) which cannot be readily removed from bracket 14.

The handcuff 1 is to be attached to the arm and hand restraints, such as handcuffs, secured on a subject, not shown. The second flexible filament 8 is secured around the legs of a subject in a general figure eight manner by threading portions of the filament 8 through the D-ring 20. Alternately, the second flexible filament 8 may be merely wrapped around a subject's legs and secured by loop 10 and hook 9 of the hook-and-loop fastener.

Figure 8:
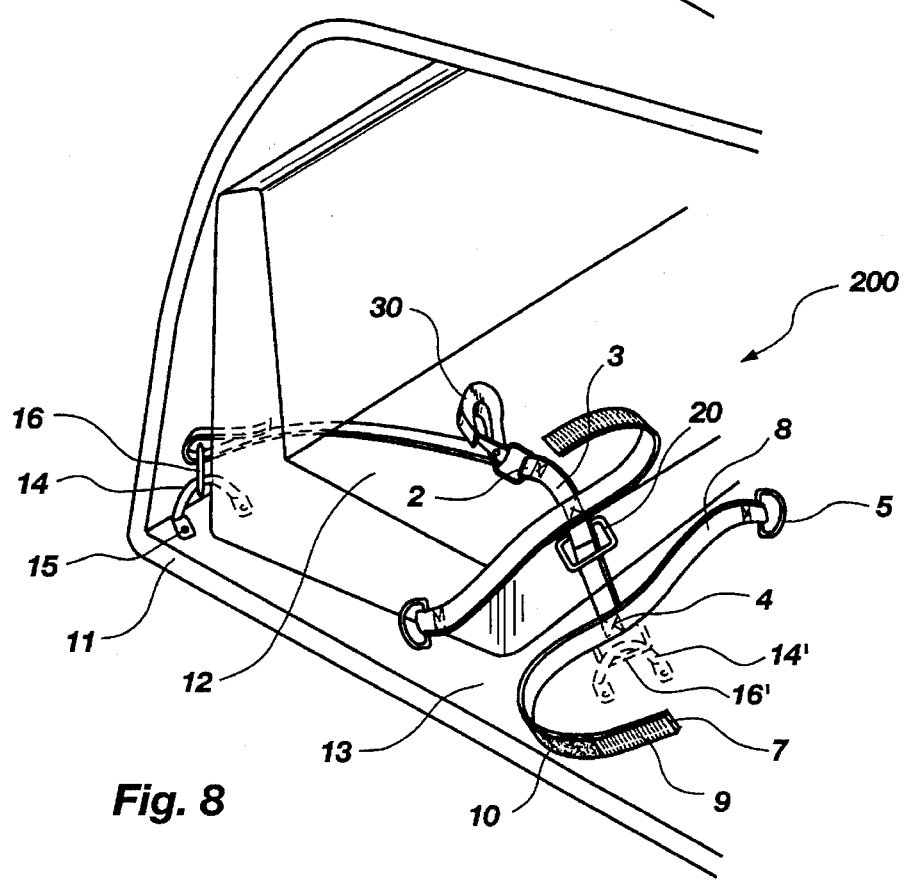
FIG. 8 is an isometric projection of an alternative configuration and mode of attaching the restraining device to the floor of a vehicle.

Referring to drawing FIG. 8, an alternative installation of the second embodiment of the restraining device 200 is shown. The generally U-shaped bracket 14 is secured at any desired location on the floor 13 of a vehicle behind the seat 12 thereof. The first flexible filament 3 is secured by any suitable D-ring or releasable hook or member 16 (shown schematically), which may not be readily removed by a suspect, to bracket 14 with the hook 30 on end 2 of filament 3 being located in the front of the seat 12 along with second flexible filament 8. In this manner, the hook 30 may be fastened to the hand and arm restraint secured to a subject while second flexible filament 8 is used to secure the legs of a subject as described hereinbefore.

Alternately, a bracket 14' may be secured to the floor 13 in front of the seat 12 and a hook 16' attached to the second filament 8 and bracket 14' used to secure the legs of a subject while the hook 30 is used to secure the hands and arms of a subject as described hereinbefore.

Figure 9:
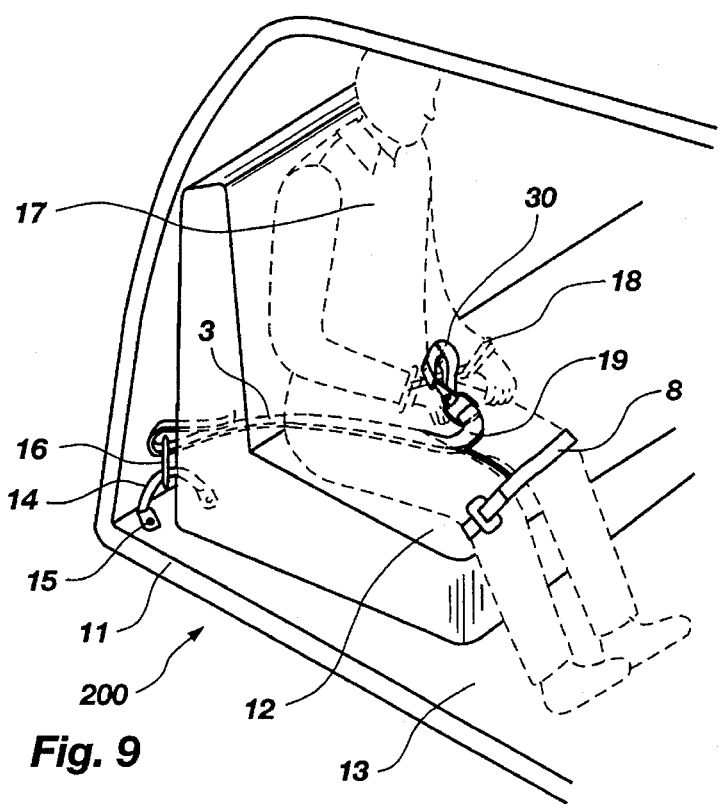
FIG. 9 is an isometric projection representing the embodiment of the invention shown in FIG. 4 employed to restrain a subject shown wearing arm and hand restraints, by attaching the stem member to the subject's arm and hand restraints and securing the crossbar member around the subject's legs.

Referring to drawing FIG. 9, the second embodiment restraining device 200 is shown installed on a subject 17, shown in phantom.

The first flexible filament 3 is shown secured to bracket 14 via D-ring or suitable releasable hook 16 (shown schematically) with a portion of filament 3 extending between the subject's legs and hook 30 secured to the hand and arm restraints 18 secured to the subject. The second filament 8 is secured about the legs approximately at the knees of the subject for restrain thereof.

In this manner of restraint, the subject 17 is prevented from readily moving about, particularly, the subject's hands and legs.

Figure 10:
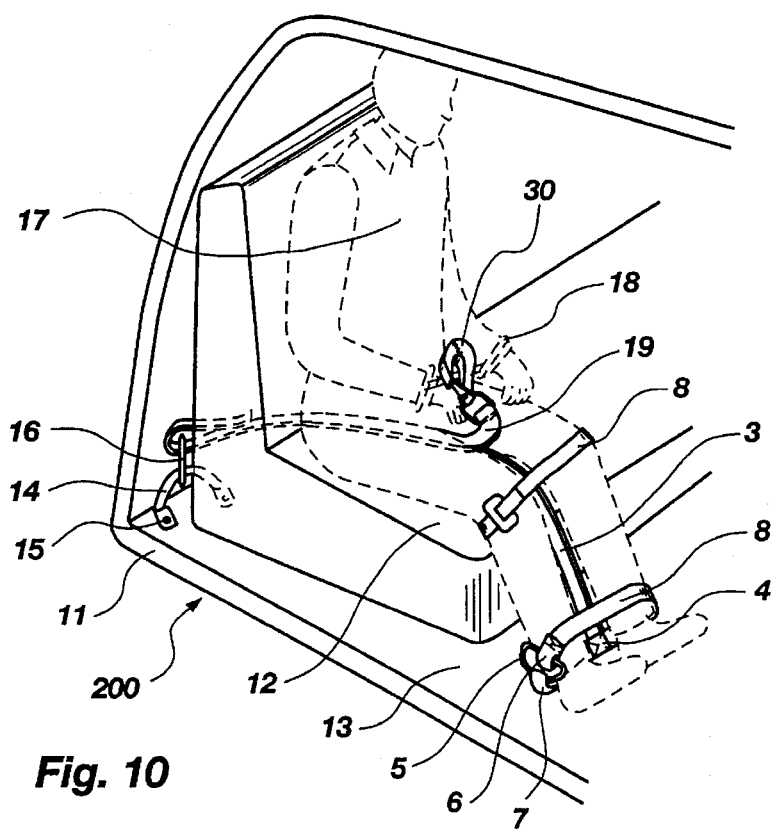
FIG. 10 is an isometric projection representing the embodiment of the invention shown in FIG. 8 employed to restrain a subject, shown wearing arm and hand restraints, by attaching the stem member to the subject's arm and hand restraints and securing the crossbar member around the subject's legs at knee and ankle level.

Referring to drawing FIG. 10, the second embodiment 200 of the present invention is shown installed on a subject with the hook 30 engaging the rod-type handcuffs on the subject and two flexible members 8 being secured about the subject's knees and ankles to secure the same. A suitable D-ring or releasable hook 16 (shown schematically) secures the restraint system 200 via bracket 14 to the floor 13 of the vehicle behind the seat therein.

The restraining devices 100, 200, 300 and 400 of the present invention are suited for use in law enforcement vehicles to restrain subjects located therein. The restraining device is easy to install and use as well as easy to be transferred for use in different vehicles.

The first 3 and second 8 filaments of the restraining devices 100, 200, 300 and 400 may be fabricated from any suitable material, such as nylon webbing, leather, flexible metal webbing covered with plastic, etc. as desired. Similarly, any type of handcuff or spring loaded hooks may be used to attach the restraining device 100 to either a subject or a portion of a vehicle.

Additionally, if desired an additional second filament 8 may be attached to the first filament 3 at an intermediate location thereon to use further restrain a subject's legs at another location.

Furthermore, the subject's hands may include a protective box or member enclosing the handcuffs for the handcuff 1 or spring loaded hook 30 to engage to further prevent movement of a subject's hands.

Further changes, modifications, additions, deletions and improvements of the present invention can be made which are within the scope of the invention.

What is claimed is:

1. A restraining device used in a vehicle having a seat therein, said restraining device comprising:

a first filament member having a first end and a second end;

a second filament member having a first end and a second end, the second filament member secured to a portion of the first filament member at a location intermediate the first end and the second end of the first filament member, and the second filament member;

a first fastening member connected to a portion of the first filament member;

a second fastening member having a first portion and a second portion thereof, the first portion secured to the first end of the second filament member and the second portion secured to the second end of the second filament member, the first portion and second portion in releasable engagement to secure the first end of the second filament to the second end thereof; and a third fastening member for securing said restraining device to a portion of said vehicle.

2. The device of claim 1, wherein the third fastening member for attaching said restraining device to said vehicle is located in front of said seat.

3. The device of claim 1, wherein the third fastening member for attaching said restraining device to said vehicle is located behind said seat.

4. The device of claim 1, wherein the first fastening member comprises a handcuff.

5. The device of claim 1, wherein the first fastening member comprises a releasable hook.

6. The device of claim 1, wherein the second fastening member comprises hook and loop fastening members located on the first end of the second filament member and a ring located on the second end of the second filament member.

7. The device of claim 1, wherein the first fastening member comprises hook and loop fastening members located on the first end of the first filament and a D-ring located on the first filament member.

8. The device of claim 1, wherein the restraining device further comprises:

a third filament member having a first end and a second end, the third filament member secured to a portion of the first filament member.

9. The device of claim 1, wherein the third fastening member for attaching said restraining device to a portion of said vehicle can be located below an individual being transported in said vehicle.

10. The device of claim 1, wherein the second fastening member comprises a spring loaded buckle located on the first end of the second filament member and a buckle insert located on the second end of the second filament member.

11. A restraining device used in a vehicle having a seat therein, said restraining device comprising:

a first filament member having a first end and a second end;

a second filament member having a first end and a second end, the second filament member secured to a portion of the first filament member adjacent the second end of the first filament member;

a first fastening member connected to a portion of the first filament member, the first fastening member including a handcuff;

a second fastening member having a first portion and a second portion thereof, the first portion secured to the first end of the second filament member and the second portion secured to the second end of the second filament member the first portion and second portion in releasable engagement to secure the first end of the second filament member to the second end of the second filament member; and a third fastening member for securing said restraining device to a portion of said vehicle.

12. A restraining device used in a vehicle having a seat therein, said restraining device comprising:

a first filament member having a first end and a second end;

a second filament member having a first end and a second end, the second filament member secured to a portion of the first filament member adjacent the second end of the first filament member;

a first fastening member connected to a portion of the first filament member, the first fastening member includes hook and loop fastening members located on the first end of the first filament member and a ring located on the second end of the first filament member;

a second fastening member having a first portion and a second portion thereof, the first portion secured to the first end of the second filament member and the second portion secured to the second end of the second filament member, the first portion and second portion in releasable engagement to secure the first end of the second filament to the second end thereof; and a third fastening member for securing said restraining device to a portion of said vehicle.

* * * * *